(12) United States Patent
Bizlewicz (10) Patent No.: US 6,895,870 B1
(45) Date of Patent: May 24, 2005

(54) APPARATUS AND METHOD FOR STACKING PLURAL ELECTRONIC AND ELECTRO-ACOUSTIC COMPONENTS

(76) Inventor: F. Peter Bizlewicz, 1209 Pines Lake Dr. West, Wayne, NJ (US) 07470

( * ) Notice: Subject to any disclaimer, the term of this patent is extended or adjusted under 35 U.S.C. 154(b) by 341 days.

(21) Appl. No.: 10/287,242

(22) Filed: Nov. 4, 2002

(51) Int. Cl.[7] .................................. A47B 7/00
(52) U.S. Cl. ........................... 108/91; 211/151
(58) Field of Search .................. 108/91, 92, 93, 108/53.1, 53.3, 57.12, 57.15; 248/560, 562, 248/636, 638; 211/188, 151

(56) References Cited

U.S. PATENT DOCUMENTS

| | | |
|---|---|---|
| 228,962 A | 6/1880 | Weir |
| 1,005,963 A | 10/1911 | Groat et al. |
| 2,317,821 A | 4/1943 | Stein |
| 2,414,506 A | 1/1947 | Bowen |
| 2,572,969 A | 10/1951 | Bacon et al. |
| 2,828,589 A | 4/1958 | Hercik |
| 3,441,331 A | 4/1969 | Kesling |
| 3,771,270 A | 11/1973 | Byers |
| 4,314,623 A | 2/1982 | Kurokawa |
| 4,432,441 A | 2/1984 | Kurokawa |
| 4,471,331 A | 9/1984 | Wyatt |
| 4,496,130 A | 1/1985 | Toyama |
| 4,595,166 A | 6/1986 | Kurokawa |
| 4,726,161 A | 2/1988 | Yaghoubian |
| 4,771,858 A | 9/1988 | Goodloe |
| 4,883,250 A | 11/1989 | Yano et al. |
| 4,974,378 A | 12/1990 | Shustov |
| 5,056,280 A | 10/1991 | Shustov |
| 5,236,186 A | 8/1993 | Weltin et al. |
| 5,253,841 A | 10/1993 | Yamada |
| 5,285,995 A | 2/1994 | Gonzalez et al. |
| 5,445,249 A | 8/1995 | Aida et al. |
| 5,471,802 A | 12/1995 | Yano et al. |
| 5,689,919 A * | 11/1997 | Yano ........................... 248/562 |
| 5,693,990 A | 12/1997 | Miyazaki |
| 5,896,961 A | 4/1999 | Aida et al. |
| 5,905,804 A | 5/1999 | Lee |
| 5,913,503 A * | 6/1999 | Satoh et al. ................. 248/636 |
| 5,942,735 A | 8/1999 | Liang |
| 5,975,510 A | 11/1999 | Miyazaki |
| 6,052,955 A * | 4/2000 | Haider ........................ 248/560 |
| 6,127,757 A | 10/2000 | Swinbanks |
| 6,230,460 B1 * | 5/2001 | Huyett ........................ 248/560 |
| 6,688,051 B2 * | 2/2004 | Tsai ............................ 248/636 |
| 6,739,153 B2 * | 5/2004 | Davies et al. ............. 108/57.12 |

FOREIGN PATENT DOCUMENTS

JP 02180323 A * 7/1990

* cited by examiner

Primary Examiner—Jose V. Chen
(74) Attorney, Agent, or Firm—Arthur Jacob (57) ABSTRACT

Apparatus and method for stacking plural electronic or electro-acoustic components in a vertical stacked arrangement on a horizontal support surface such that vibratory energy generated within each component is transmitted and dissipated while each of the plural components is isolated from vibratory energy emanating from others of the plural components and from vibratory energy emanating from the horizontal support surface. The components are supported on vertically spaced apart horizontal support members coupled to corresponding vertical support members for enabling relative horizontal movements between each horizontal support member and the corresponding vertical support members while effecting relative vertical movements in response to the relative horizontal movements.

17 Claims, 7 Drawing Sheets

APPARATUS AND METHOD FOR STACKING PLURAL ELECTRONIC AND ELECTRO-ACOUSTIC COMPONENTS

The present invention relates generally to stacking components and pertains, more specifically, to apparatus and method for stacking plural electronic or electro-acoustic components in a vertical stacked arrangement on a horizontal support surface such that vibratory energy generated within each component is transmitted and dissipated, while the plural components are isolated from one another and from vibratory energy emanating from the horizontal surface.

It is quite common to arrange components, particularly electronic or electro-acoustic components, in a vertical stacked arrangement. A very wide variety of racks have been offered for facilitating the installation and use of such components in vertically stacked arrays. Many racks provide for adjustments to accommodate components of various sizes while maintaining a compact grouping of components. Other attributes, such as ventilation and ease of access for installation and maintenance of components have been addressed by providing a variety of structural features.

The present invention enables the stacking of plural electronic or electro-acoustic components for use in a vertical stacked arrangement while providing for isolation of the components from one another and from the surface upon which the stack is supported such that vibratory energy generated within each component is transmitted and dissipated and each of the components is isolated from vibratory energy emanating from the others and from the support surface. As such, the present invention attains several objects and advantages, some of which are summarized as follows: Provides for the stacking of electronic or electro-acoustic components in a vertical array for convenient use of the components while accomplishing the transmission and dissipation of vibrational energy from the components and isolating each component from vibrational energy emanating from the other components and from the surface upon which the array is supported; readily accommodates components of various dimensions, and especially of differing vertical heights, in a single stack; enables a modular construction capable of ready assembly in a variety of structural configurations for the selective arrangement of components in almost any desired array; provides a high degree of versatility in the arrangement of a stacked array of components; allows relatively open access to each component of a stacked array of components for ease of installation and maintenance, as well as for meeting ventilation requirements of the various components; establishes an installation of stacked components which exhibits a unique and a highly desirable aesthetic appearance; provides a rugged construction capable of exemplary performance over an extended service life.

The above objects and advantages, as well as further objects and advantages, are attained by the present invention which may be described briefly as a component stacking apparatus for stacking plural electronic or electro-acoustic components in a vertical stacked arrangement on a horizontal support surface such that vibratory energy generated within each component is transmitted and dissipated while each of the plural components is isolated from vibratory energy emanating from others of the plural components and from vibratory energy emanating from the horizontal support surface, the component stacking apparatus comprising: essentially rigid horizontal support members for supporting each component on a corresponding horizontal support member; essentially rigid vertical support members for spacing the horizontal support members vertically from one another to establish a vertical stacked arrangement of horizontal support members, with each horizontal support member supported by corresponding vertical support members; and couplings for coupling each horizontal support member with corresponding vertical support members, each coupling including: a lower block member having an upper surface; a first depression in the upper surface; an upper block member having a lower surface juxtaposed with the upper surface of the lower block member; a second depression in the lower surface for confronting the first depression; and a rolling member engaged between the first depression and the second depression for rolling movement in lateral directions relative to the lower and upper block members in response to relative movements between the lower and upper block members in lateral directions; the first and second depressions being configured for enabling relative displacement between the lower block member and the upper block member in horizontal directions and for effecting relative displacement between the lower block member and the upper block member in vertical directions away from and toward an equilibrium position, and for biasing the upper and lower block members toward the equilibrium position, in response to rolling movement of the rolling member; the couplings enabling relative movement between each horizontal support member and the corresponding vertical support members in horizontal and vertical directions corresponding to the relative displacement between the upper and lower block members of the couplings, such that vibratory energy is transmitted and dissipated from the horizontal support members, while each horizontal support member is isolated from vibratory energy emanating from others of the horizontal members and from vibratory energy emanating from the horizontal support surface.

Further, the present invention includes a method for stacking plural electronic or electro-acoustic components in a vertical stacked arrangement on a horizontal support surface such that vibratory energy generated within each component is transmitted and dissipated while each of the plural components is isolated from vibratory energy emanating from others of the plural components and from vibratory energy emanating from the horizontal support surface, the method comprising: supporting each component on a corresponding essentially rigid horizontal support member; spacing the horizontal support members vertically from one another to establish a vertical stacked arrangement of horizontal support members, with each horizontal support member supported by corresponding vertical support members; and coupling each horizontal support member with corresponding vertical support members for enabling relative movement between each horizontal support member and the corresponding vertical support members in horizontal directions away from and toward an equilibrium position, and effecting relative movement between each horizontal support member and the corresponding vertical support members in vertical directions away from and toward the equilibrium position in response to the relative movement in the horizontal directions, such that vibratory energy is transmitted and dissipated from the horizontal support members, while each horizontal support member is isolated from vibratory energy emanating from others of the horizontal members and from vibratory energy emanating from the horizontal support surface.

The present invention will be understood more fully, while still further objects and advantages will become apparent, in the following detailed description of preferred embodiments of the invention illustrated in the accompanying drawing, in which:

Figure 1:
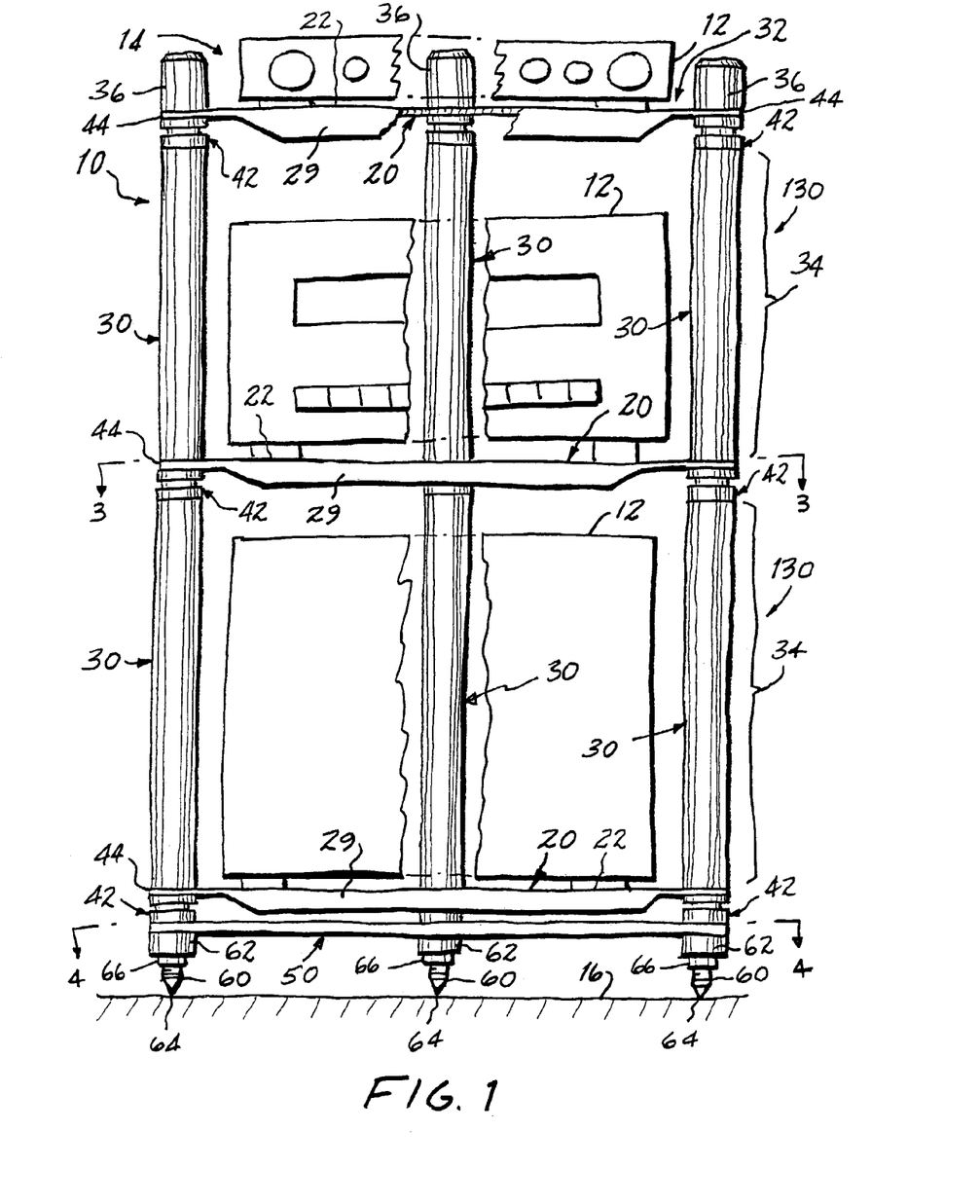
FIG. 1 is a front elevational view of a rack constructed in accordance with the present invention.
Figure 2:
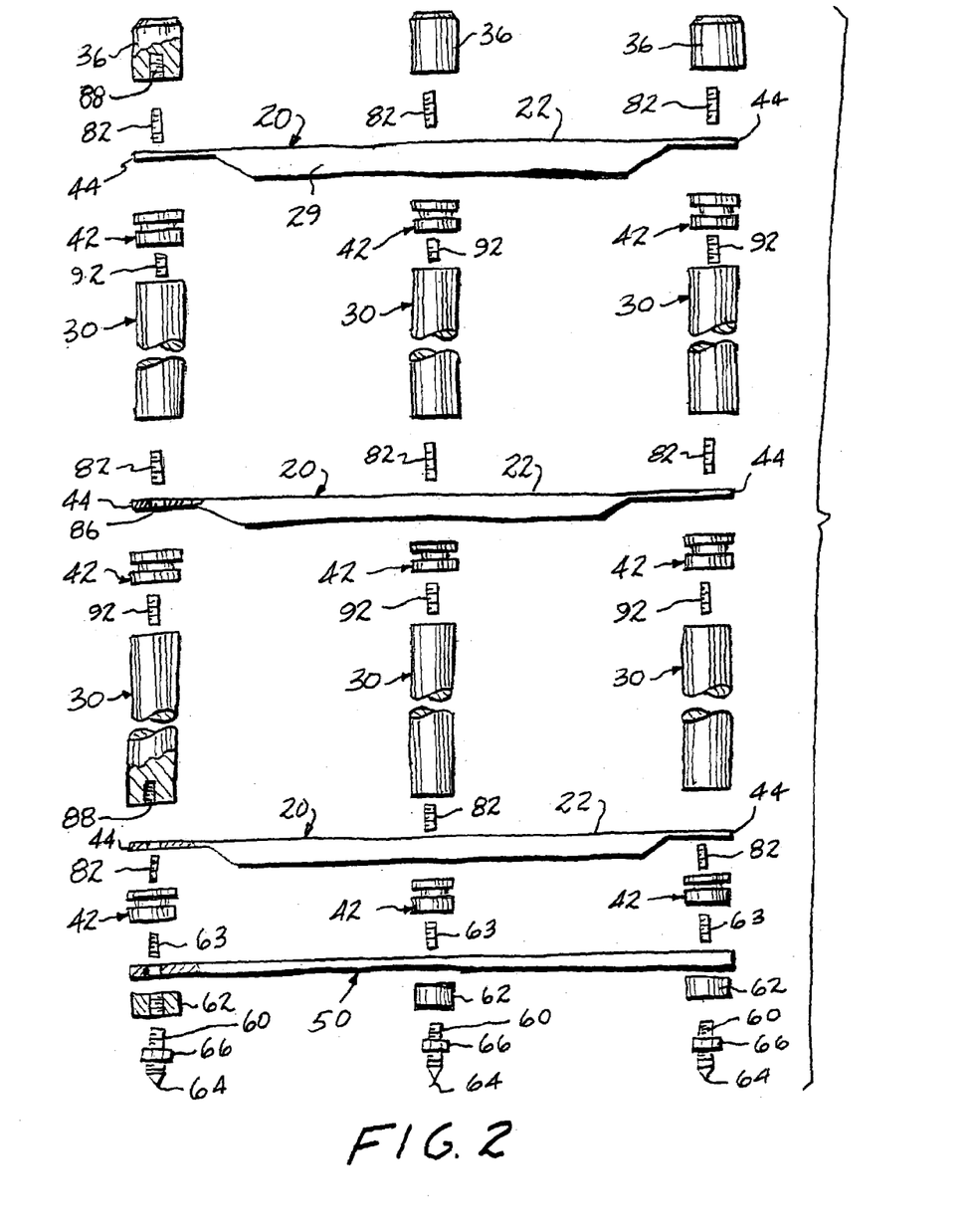
FIG. 2 is an exploded front elevational view of the rack.

Referring now to the drawing, and especially to FIGS. 1 and 2 thereof, a component stacking apparatus constructed in accordance with the present invention is shown in the form of a rack 10 and is seen in FIG. 1 in use stacking plural electro-acoustic components 12 in a vertical stacked arrangement 14 on a horizontal support surface illustrated in the form of a floor 16. Each component 12 is placed upon a corresponding horizontal support member shown in the form of a shelf 20 having an essentially flat generally rectangular support surface 22 extending between a front edge 24, a rear edge 26 and side edges 28 (see FIG. 3). Shelf 20 preferably is constructed of a relatively rigid material, such as a sheet of aluminum or stainless steel, and includes an integral rib 29, preferably unitary with the shelf 20 and bent downwardly along the front edge 24 of shelf 20 to add rigidity to the shelf 20. Vertical support members are shown in the form of columns 30 and are placed vertically between adjacent shelves 20 to space the shelves 20 vertically from one another and establish a vertical stacked arrangement 32 of shelves 20. In the illustrated embodiment of rack 10, columns 30 are constructed of solid rods of relatively rigid material, such as aluminum or stainless steel. Alternately, columns 30 may be constructed in the form of tubes filled with a vibratory energy damping material. Each column 30 has a predetermined length and the choice of columns of selected length for placement between adjacent shelves 20 determines the vertical spacing between those adjacent shelves 20. Thus, in the preferred embodiment, each shelf 20 is supported by corresponding columns 30 in a set 34 of three columns 30 of the same length. By selecting a particular set 34 of columns 30 of predetermined length from sets of different lengths, a vertical spacing is selected between adjacent shelves 20 in the vertical stacked arrangement 32 of shelves 20. Caps 36 secure the uppermost shelf 20 to corresponding columns 30 and are extended upwardly to form decorative finials for aesthetic purposes.

Figure 3:
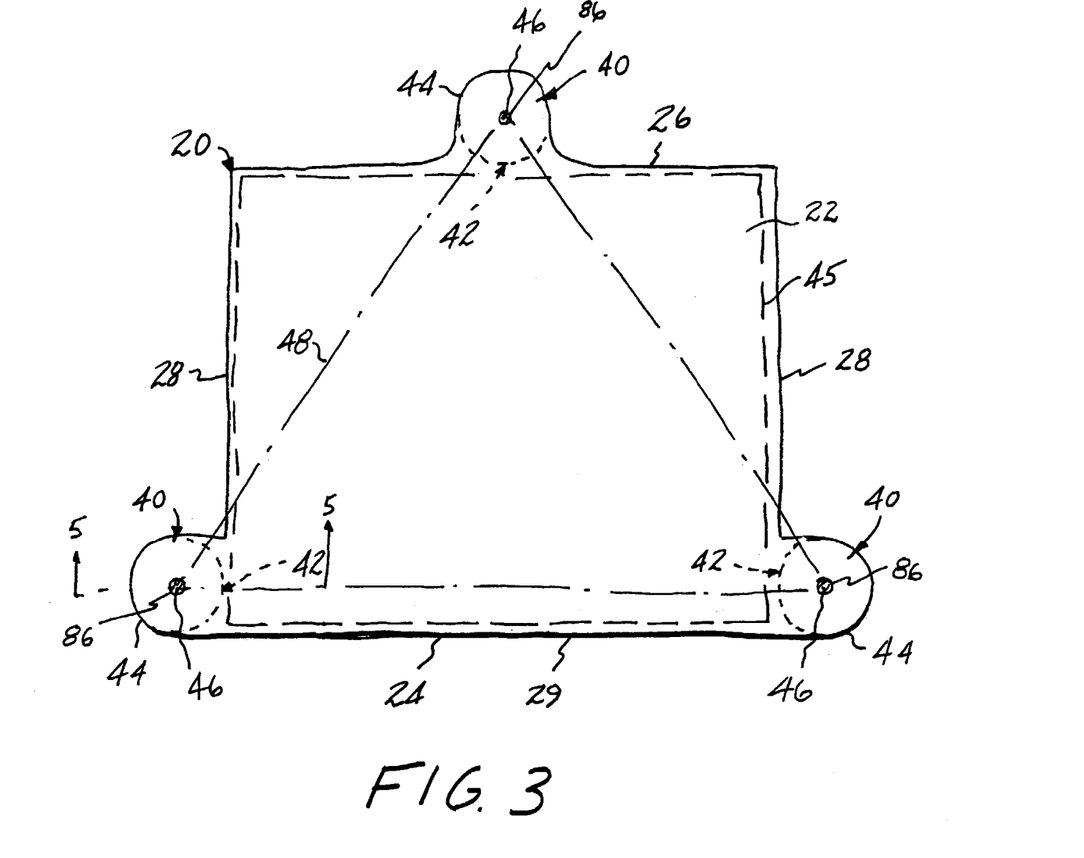
FIG. 3 is a top plan view taken along line 3—3 of FIG. 1.

As best seen in FIG. 3, each shelf 20 has a generally rectangular plan configuration and includes support locations 40 spaced apart horizontally from one another. A coupling 42 is placed at each support location 40 for coupling corresponding columns 30 to each shelf 20. In the preferred construction, the support locations 40 are placed on ears 44 integral with each shelf 20 and extending horizontally outside the generally rectangular configuration of support surface 22 so as to provide an unrestricted essentially rectangular area 45 for supporting a component 12. In the preferred configuration of rack 10, three support locations 40 are employed and are placed at the apices 46 of a triangle 48 for stability as well as for aesthetic purposes. The two support locations 40 adjacent the front edge 26 of shelf 20 are placed on ears 44 extending laterally out of the generally rectangular area 45 of support surface 22, while the single support location 40 adjacent the rear edge 28 of the shelf 20 extends rearwardly out of the generally rectangular area 45. The arrangement enables increased ease of access to a component 12 placed on the shelf 20 for facilitating installation and maintenance of the component 12, as well as providing for appropriate ventilation.

Figure 4:
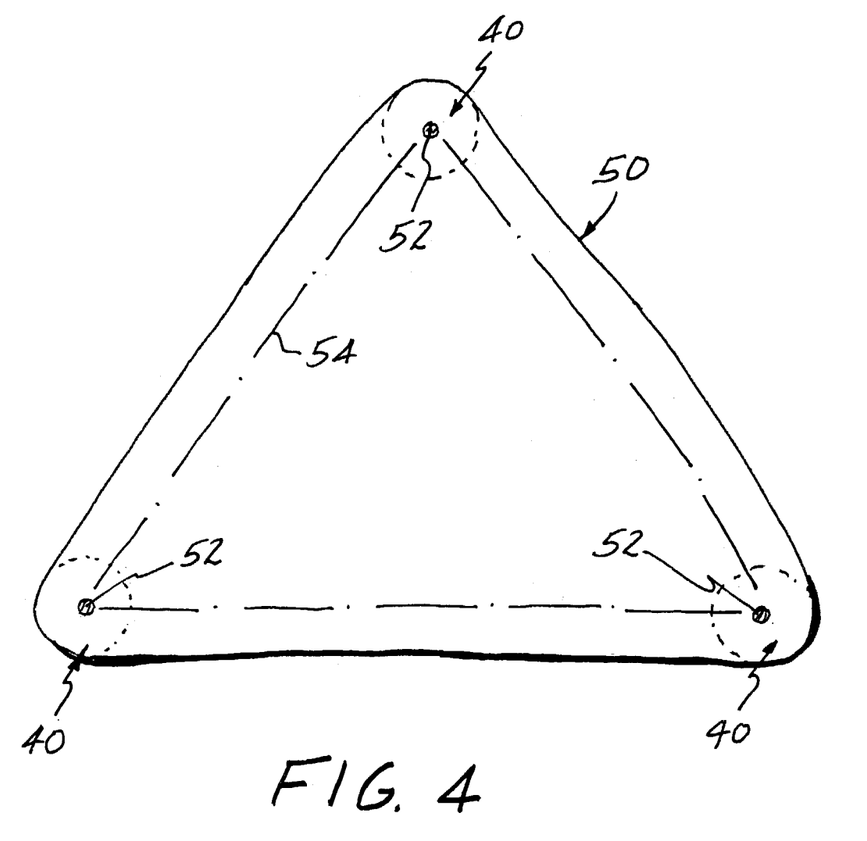
FIG. 4 is a top plan view taken along line 4—4 of FIG. 1.

As shown in FIG. 4, as well as in FIGS. 1 and 2, a base 50 is coupled to the lowermost columns 30 and includes a generally triangular configuration with a support location 40 at each apex 52 of a triangle 54. Feet 60 are threaded into support pads 62 affixed to the base 50, as by threaded studs 63, and terminate in lower conical, pointed support ends 64. Leveling of the base 50 on the floor 16 is accomplished by threaded adjustment of the elevation of the ends 64 of the feet 60, and a jam nut 66 locks each foot 60 in place at the correct elevation of corresponding end 64.

Figure 5:
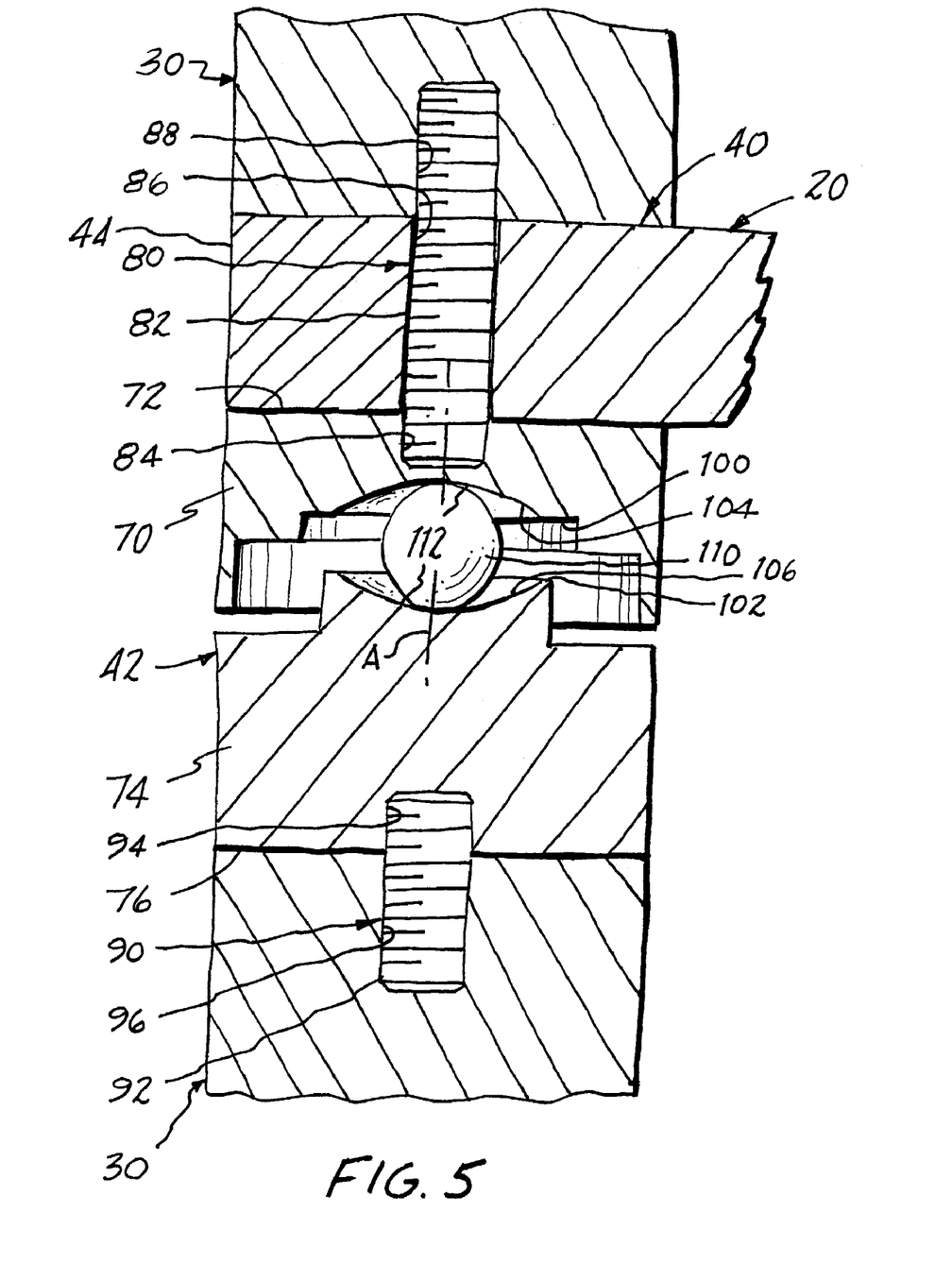
FIG. 5 is an enlarged cross-sectional view taken along line 5—5 of FIG. 3.
Figure 6:
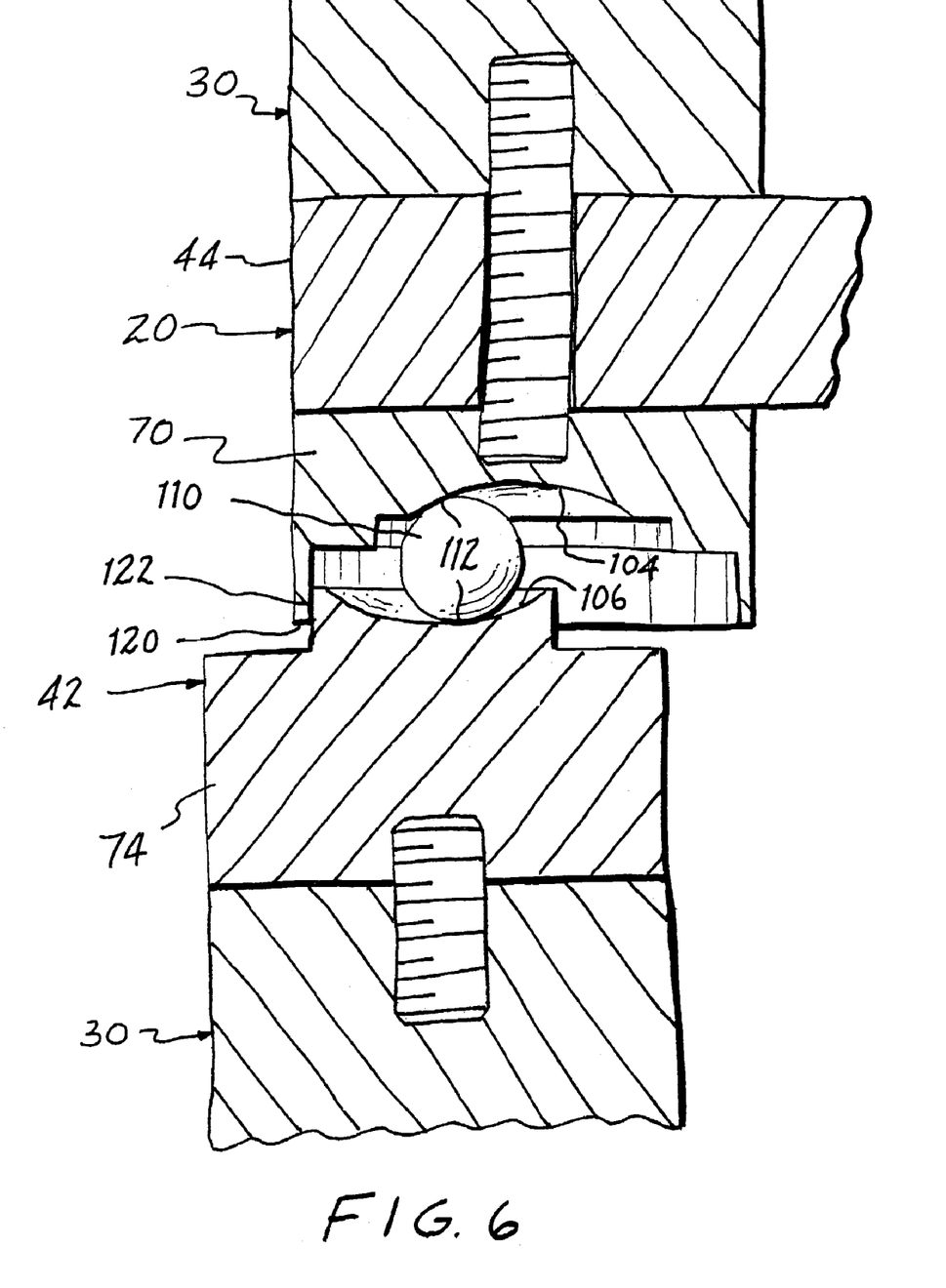
FIG. 6 is a cross-sectional view similar to FIG. 5, but with the parts in another position of operation.

Turning now to FIGS. 5 and 6, each coupling 42 includes an upper block member 70 having an upper surface 72, and a lower block member 74 having a lower surface 76. An upper connector 80 includes connector elements in the form of a threaded stud 82 anchored in a threaded hole 84 in the upper block member 70. The threaded stud 82 extends upwardly to pass through an opening 86 at a support location 40 of a shelf 20 and the corresponding ear 44 of the shelf 20 is captured between the upper surface 72 of upper block member 70 and a connector member, shown here in the form of a column 30 of the next adjacent set 34. Shelf 20 is secured to an upper block member 70 at each support location 40 by virtue of the further engagement of threaded stud 82 with a further connector element in the form of a threaded hole 88 in the column 30 to clamp each ear 44 between a corresponding column 30 and upper block member 70. Uppermost shelf 20 likewise is clamped in place by threading threaded studs 82 into threaded holes 88 in caps 36. A lower connector 90 includes a connector element in the form of a depending threaded stud 92 anchored in a threaded hole 94 in the lower block member 74, adjacent the lower surface 76. The threaded stud 92 engages another connector element in the form of a complementary threaded hole 96 in a corresponding column 30 to secure the column 30 to the lower block member 74.

Upper block member 70 has a lower surface 100, and lower block member 74 has an upper surface 102 confronting lower surface 100. A first depression 104 in the lower surface 100 confronts a second depression 106 in the upper surface 102. A rolling member shown in the form of a spherical ball 110 is interposed between the lower surface 100 and the upper surface 102 and is engaged with the depressions 104 and 106. Each depression 104 and 106 includes a part-spherical surface profile contour configuration 112 having a diameter greater than the diameter of the ball 110.

In an equilibrium position illustrated in FIG. 5, the upper block member 70, the lower block member 74 and the ball 110 are aligned along a common vertical axis A. Any vibratory energy emanating from a component 12 and transmitted to a corresponding shelf 20, and any vibratory energy emanating from the floor 16 and transmitted to corresponding columns 30 will cause relative displacement between the upper block member 70 and the lower block member 74 in lateral directions away from the equilibrium position. In response to such lateral displacement, ball 110 will roll in lateral directions relative to the upper and lower block members 70 and 74. The configuration 112 of each of the depressions 104 and 106 enables relative displacement between the upper and lower block members 70 and 74 in horizontal directions and effects relative displacement between the upper and lower block members 70 and 74 in vertical directions away from and toward the equilibrium position, and concomitant relative movement between each shelf 20 and corresponding columns 30, such that vibratory energy is transmitted and dissipated from the shelves 20 while each shelf 20 is isolated from vibratory energy emanating from other shelves 20 and from vibratory energy emanating from floor 16. By virtue of the configuration 112 of the depressions 104 and 106, the upper and lower block members 70 and 74 and the ball 110 and, concomitantly, the shelves 20 and columns 30, are biased back toward the equilibrium position by the force of gravity.

As illustrated in FIG. 6, in order to provide greater stability to rack 10, relative displacement between the upper and lower block members 70 and 74 in lateral directions is limited so as to preclude unwanted disengagement of ball 110 from depressions 104 and 106. To that end, complementary stop members are provided on the upper and lower block members 70 and 74 to limit relative movement between the upper and lower block members 70 and 74 to a range of movement within which ball 110 is confined to engagement with depressions 104 and 106 and wherein relative displacement of the upper and lower block members 70 and 74 in horizontal directions effects relative displacement in vertical directions. A first stop member is shown in the form of a depending skirt 120 on the upper block member 70 extending downwardly toward the lower block member 74 and juxtaposed with and vertically overlapping a second stop member in the form of a vertical shoulder 122 on the lower block member 74 extending upwardly toward the upper block member 70. Engagement of the skirt 120 with the shoulder 122, as shown, precludes excessive lateral excursion between the upper and lower block members 70 and 74 which otherwise could disengage ball 110 from depressions 104 and 106, causing uncontrolled and unbiased lateral displacements of the shelves 20 and having an adverse effect on the integrity of rack 10. Biasing of the upper and lower block members 70 and 74, and the ball 110, back to the equilibrium position by the force of gravity is assured by thus confining ball 110 to engagement with depressions 104 and 106.

Referring now to FIGS. 1 and 2, as well as to FIGS. 5 and 6, coupling of a shelf 20 with a selected set 34 of corresponding columns 30 establishes a module 130 comprised of a shelf 20, corresponding columns 30 and corresponding couplings 42. Any number of modules 130 can be assembled to provide rack 10 with a desired number of shelves 20, all isolated from one another and from floor 16 by virtue of couplings 42. The choice of a set 34 of columns 30 of selected length provides a module 130 with a vertical height selected to accommodate a component 12 of given height. Caps 36 secure the uppermost shelf 20 to the uppermost couplings 42 of a completed rack 10 and provide decorative finials for a finished, aesthetically pleasing appearance.

Figure 7:
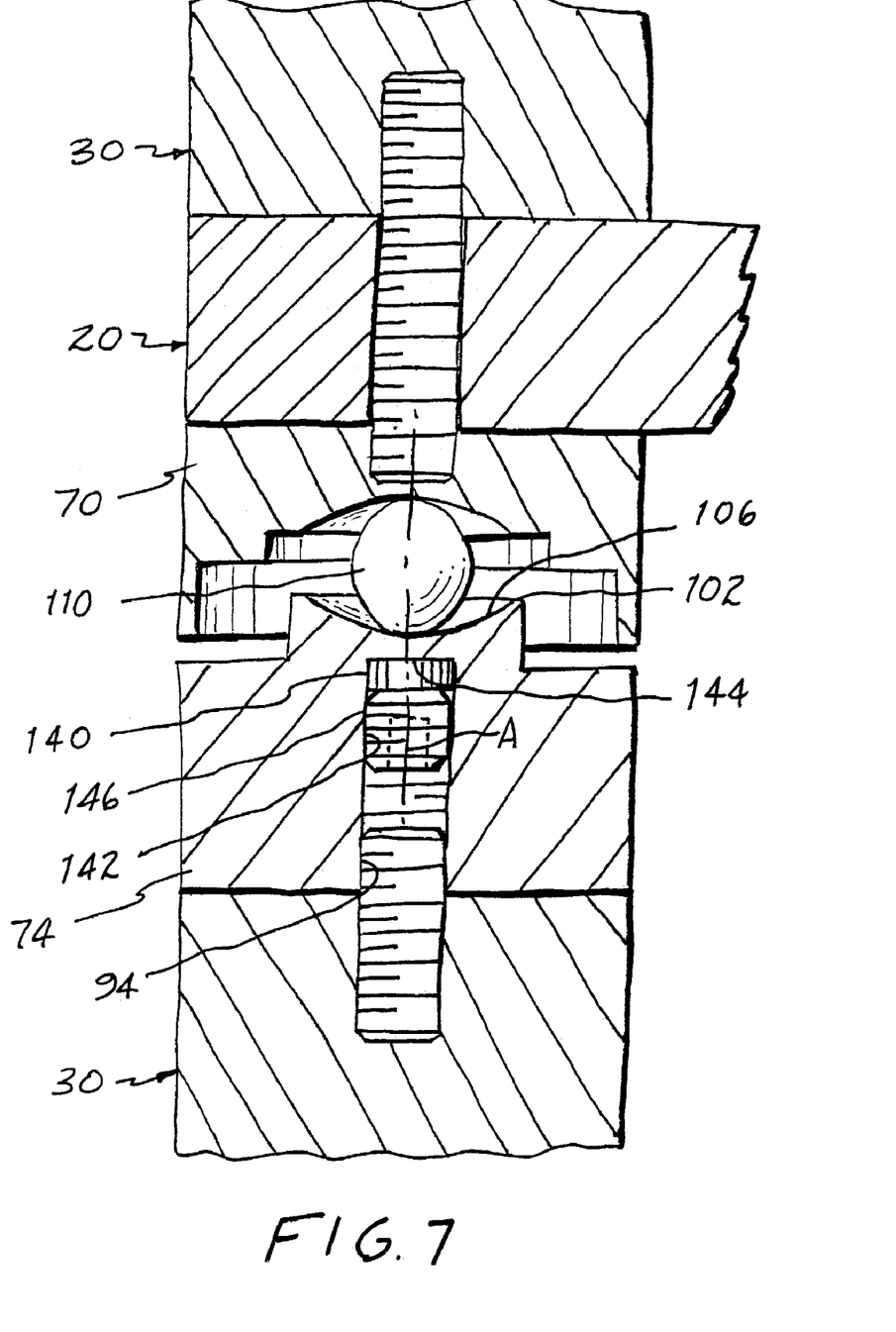
FIG. 7 is a cross-sectional view similar to FIG. 5 and showing an alternate construction.

Referring now to the embodiment illustrated in FIG. 7, operation of the couplings 42 is enhanced by providing a further biasing force tending to return the upper and lower block members 70 and 74 toward the equilibrium position. To this end, ball 110 is constructed of a magnetically-attracted material, such as steel, and a magnet 140 is placed adjacent the upper surface 102 of the lower block member 74, aligned with the vertical axis A. Thus, in the embodiment of FIG. 7, lower block member 74 is provided with a threaded extension 142 of threaded hole 94 extending along axis A, extension 142 having a bottom 144 placed closely adjacent the center of depression 106. Magnet 140 is placed in the hole 142 and is secured in place by a set screw 146. Upon movement of ball 110 away from the equilibrium position, magnet 140 will exert a magnetic biasing force tending to return the ball 110, and the upper and lower block members 70 and 74 toward the equilibrium position. Reference is made to application serial number, filed of even date herewith, entitled VIBRATORY ENERGY DISSIPATION AND ISOLATION WITH MAGNETICALLY BIASED ROLLING MEMBERS, for a further detailed description of such magnetic biasing, the disclosure of which application is incorporated herein by reference thereto.

It will be seen that the present invention attains all of the objects and advantages summarized above, namely: Provides for the stacking of electronic or electro-acoustic components in a vertical array for convenient use of the components while accomplishing the transmission and dissipation of vibrational energy from the components and isolating each component from vibrational energy emanating from the other components and from the surface upon which the array is supported; readily accommodates components of various dimensions, and especially of differing vertical heights, in a single stack; enables a modular construction capable of ready assembly in a variety of structural configurations for the selective arrangement of components in almost any desired array; provides a high degree of versatility in the arrangement of a stacked array of components; allows relatively open access to each component of a stacked array of components for ease of installation and maintenance, as well as for meeting ventilation requirements of the various components; establishes an installation of stacked components which exhibits a unique and a highly desirable aesthetic appearance; provides a rugged construction capable of exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive: property or privilege is claimed are defined as follows:

1. A component stacking apparatus for stacking plural electronic or electro-acoustic components in a vertical stacked arrangement on a horizontal support surface such that vibratory energy generated within each component is transmitted and dissipated while each of the plural components is isolated from vibratory energy emanating from others of the plural components and from vibratory energy emanating from the horizontal support surface, the component stacking apparatus comprising:

essentially rigid horizontal support members for supporting each component on a corresponding horizontal support member;

essentially rigid vertical support members for spacing the horizontal support members vertically from one another to establish a vertical stacked arrangement of horizontal support members, with each horizontal support member supported by corresponding vertical support members; and couplings for coupling each horizontal support member with corresponding vertical support members, each coupling including:

a lower block member having an upper surface;

a first depression in the upper surface;

an upper block member having a lower surface juxtaposed with the upper surface of the lower block member;

a second depression in the lower surface for confronting the first depression; and a rolling member engaged between the first depression and the second depression for rolling movement in lateral directions relative to the lower and upper block members in response to relative movements between the lower and upper block members in lateral directions;

the first and second depressions being configured for enabling relative displacement between the lower block member and the upper block member in horizontal directions and for effecting relative displacement between the lower block member and the upper block member in vertical directions away from and toward an equilibrium position, and for biasing the upper and lower block members toward the equilibrium position, in response to rolling movement of the rolling member;

the couplings enabling relative movement between each horizontal support member and the corresponding vertical support members in horizontal and vertical directions corresponding to the relative displacement between the upper and lower block members of the couplings, such that vibratory energy is transmitted and dissipated from the horizontal support members, while each horizontal support member is isolated from vibratory energy emanating from others of the horizontal members and from vibratory energy emanating from the horizontal support surface.

2. The apparatus of claim 1 wherein the rolling member comprises a spherical ball, and the first and second depressions include a part-spherical profile contour configuration.

3. The apparatus of claim 1 wherein at least one member of the lower block member, the upper block member and the rolling member includes a magnetically-attracted structure, and the apparatus includes a magnet located relative to the one member and the equilibrium position to establish a magnetic biasing force for biasing the lower and upper block members toward the equilibrium position.

4. The apparatus of claim 1 wherein:

each horizontal support member includes support locations spaced apart horizontally from one another for enabling each coupling to couple a horizontal support member with a corresponding vertical support member at each support location; and each coupling includes an upper connector for connecting the upper block member of the coupling to a horizontal support member at a support location, and a lower connector for connecting the lower block member of the coupling to the corresponding vertical support member at the support location.

5. The apparatus of claim 4 wherein the support locations are placed at apices of a triangle.

6. The apparatus of claim 4 wherein:

each horizontal support member comprises a shelf; and each vertical support member comprises a column for being interposed between vertically spaced apart shelves, each column having a predetermined length for establishing a vertical spacing between the vertically spaced apart shelves, the spacing being determined by the predetermined length of each column.

7. The apparatus of claim 6 wherein each lower connector comprises selectively coupled and uncoupled connector elements for selectively connecting the lower block member of a coupling to a corresponding column.

8. The apparatus of claim 7 including:

a further shelf;

further columns; and further selectively coupled and uncoupled connector elements for selectively connecting the upper block member of each coupling to a further a column for establishing a vertical spacing between the further shelf and the spaced apart shelves.

9. The apparatus of claim 1 including complementary stop members on the upper and lower block members, the stop members being positioned relative to one another for confining relative movement between the upper and lower block members to a range of movement within which relative displacement between the upper and lower block members in vertical directions is effected in response to relative displacement between the upper and lower block members in horizontal directions.

10. The apparatus of claim 9 wherein the stop members are spaced apart horizontally when the upper and lower block members are at the equilibrium position, and are placed in a vertically overlapping arrangement for engagement to limit horizontal displacement of the upper and lower block members relative to one another to confinement of the rolling member to engagement between the first and second depressions.

11. The apparatus of claim 10 wherein the complementary stop members include a shoulder extending from one of the upper and lower block members, and a skirt extending from the other of the upper and lower block members and vertically overlapping the shoulder.

12. The apparatus of claim 11 wherein the shoulder extends upwardly from the lower block member toward the upper block member, and the skirt extends downwardly from the upper block member toward the lower block member.

13. A method for stacking plural electronic or electro-acoustic components in a vertical stacked arrangement on a horizontal support surface such that vibratory energy generated within each component is transmitted and dissipated while each of the plural components is isolated from vibratory energy emanating from others of the plural components and from vibratory energy emanating from the horizontal support surface, the method comprising:

supporting each component on a corresponding essentially rigid horizontal support member;

spacing the horizontal support members vertically from one another to establish a vertical stacked arrangement of horizontal support members, with each horizontal support member supported by corresponding vertical support members; and coupling each horizontal support member with corresponding vertical support members for enabling relative movement between each horizontal support member and the corresponding vertical support members in horizontal directions away from and toward an equilibrium position, and effecting relative movement between each horizontal support member and the corresponding vertical support members in vertical directions away from and toward the equilibrium position in response to the relative movement in the horizontal directions, such that vibratory energy is transmitted and dissipated from the horizontal support members, while each horizontal support member is isolated from vibratory energy emanating from others of the horizontal members and from vibratory energy emanating from the horizontal support surface.

14. The method of claim 13 including establishing a magnetic attraction force for biasing the horizontal support members and the corresponding vertical support members toward the equilibrium position.

15. The method of claim 13 including selecting the vertical support members from a plurality of vertical support members having different lengths so as to establish a selected vertical spacing between the horizontal support members in the vertical stacked arrangement of horizontal support members upon coupling each horizontal support member with corresponding selected vertical support members.

16. The method of claim 13 including limiting relative movement between each horizontal support member and the corresponding vertical support members to a range of movement within which relative vertical movements are effected in response to relative horizontal movements.

17. The method of claim 13 including limiting relative movement between each horizontal support member and the corresponding vertical support members in horizontal directions to a range of horizontal movement within which relative vertical movements are effected in response to relative horizontal movements.

\* \* \* \* \*